United States Patent

Benoît

[19]

[11] Patent Number: 6,023,550
[45] Date of Patent: Feb. 8, 2000

[54] BACKLIGHT SYSTEM FOR TRANSMISSIVE ELECTRO OPTICAL MODULATOR

[75] Inventor: Pascal Benoît, Stuttgart, Germany

[73] Assignee: Thomson multimedia, Boulogne-Billancourt, France

[21] Appl. No.: 09/084,549

[22] Filed: May 26, 1998

[30] Foreign Application Priority Data

May 27, 1997 [FR] France .................................. 97 06462

[51] Int. Cl.[7] .................................................... G02B 6/10
[52] U.S. Cl. ............................................................ 385/146
[58] Field of Search .............................. 385/133, 36, 43, 385/146, 901, 33; 362/302, 309, 339, 551, 561; 349/62, 65, 70, 104, 57

[56] References Cited

U.S. PATENT DOCUMENTS

| | | | |
|---|---|---|---|
| 5,161,041 | 11/1992 | Abileah et al. | 349/62 |
| 5,202,950 | 4/1993 | Arego et al. | 385/146 |
| 5,262,880 | 11/1993 | Abileah | 349/64 |
| 5,396,406 | 3/1995 | Ketchpel | 362/27 |
| 5,506,929 | 4/1996 | P-K. Tai et al. | 385/146 |
| 5,661,839 | 8/1997 | Whitehead | 385/131 |
| 5,854,872 | 12/1998 | Chen-Yu Tai | 385/133 |

FOREIGN PATENT DOCUMENTS

| | | | |
|---|---|---|---|
| 2536504 | 5/1984 | France | F21V 5/00 |
| WO94/20871 | 9/1994 | WIPO | G02B 6/26 |

*Primary Examiner*—Akm E. Ullah
*Attorney, Agent, or Firm*—Joseph S. Tripoli; Dennis H. Irlbeck

[57] ABSTRACT

The present invention relates to a backlight system for transmissive electro-optical modulator comprising: at least one source of light rays; at least one reflector for returning the light rays along a first direction referenced z; a means of transmission of light, positioned at the exit of the reflector in such a way as to transport the light rays along the z direction, one of the faces of the transmission means lying along the z direction comprising a micro-prismatic structure which specularly reflects the light rays and extracts them from the transmission means substantially along a second direction referenced x perpendicular to the first direction and a collimation means (20) situated between the source of light rays and the transmission meansz. The said collimation means (20) comprises an entrance face (21) inclined with respect to the first direction referenced z. The invention applies more particularly to retroprojection.

7 Claims, 2 Drawing Sheets

BACKLIGHT SYSTEM FOR TRANSMISSIVE ELECTRO OPTICAL MODULATOR

FIELD OF THE INVENTION

The present invention relates to an improvement to the backlight system for transmissive electro-optical modulator, and more particularly in respect of those operating under direct vision.

BACKGROUND OF THE INVENTION

Those skilled in the art are aware that transmissive displays such as liquid crystal displays have electro-optical characteristics which depend strongly on the angular conditions of observation. To overcome this drawback, it has been proposed to use a source of collimated light to illuminate the electro-optical modulator.

Several systems enabling collimated light to be obtained are known to those skilled in the art. Thus, the article from SID 94 Applications Digest entitled: "Flat collimator a back lighting assembly utilizing microprism for energy efficiency" describes a collimation system comprising a fluorescent tube, a substantially parabolic reflector surrounding the tube, a collimation section extending the reflector and a light duct or waveguide provided with a microprismatic structure on its lower surface. In this case, the light emitted by the tube is sent by the reflector into the collimation section and then into the light duct where, by specular reflection, on the microprismatic structure, substantially all of the light injected into the light duct is sent while being appropriately collimated towards the modulator provided parallel to the upper surface of the light duct.

A system of this type is represented diagrammatically in FIG. 1 in which reference 1 corresponds to the tube forming the light source, reference 2 to the collimation section, reference 3 to the light duct or waveguide, reference 4 to the microprismatic structure. In this case, and as represented in FIG. 1, the waveguide or light duct 3 comprises an upper face 3a on which the prismatic structure 4 is made, a lower face 3b or exit face and a rear face 3c. Furthermore, the entrance face of the collimation section is parallel to the entrance face of the waveguide. This waveguide structure has a number of defects. Thus, certain substantially horizontal light rays such as the ray r are reflected off the rear face 3c and are sent to the source. They do not serve to illuminate the modulator. This results in medium efficiency of the system. Furthermore, the prismatic structure being a homogeneous structure, namely all the microprisms being identical, a spatial inhomogeneity is observed in the direction of the exit lobe as are a number of spurious lobes due to the use of a unidirectional collimator parallel to the waveguide.

SUMMARY OF THE INVENTION

The object of the present invention is to overcome these drawbacks by proposing various improvements to the lighting system of the type described above.

Accordingly, the subject of the present invention is a backlight system for transmissive electro-optical modulator comprising:
  at least one source of light rays;
  at least one reflector for returning the light rays along a first direction referenced z;
  a means of transmission of light, positioned at the exit of the reflector in such a way as to transport the light rays along the z direction, one of the faces of the transmission means lying along the z direction comprising a micro-prismatic structure which specularly reflects the light rays and extracts them from the transmission means substantially along a second direction referenced x perpendicular to the first direction,
  a collimation means (20) situated between the source of light rays and the transmission means, characterized in that the collimation means comprises an entrance face inclined with respect to the first direction referenced z.

According to a preferred embodiment, this collimation means is either a linear collimator with inclined entrance face, or a concentrator with parabolic element known as a "CPC" with inclined entrance face. In this case, the collimator is inclined in such a way that its lower face is almost aligned with the exit face of the transmission means. The various images of the source which arise from reflections off the exit face and off the faces of the collimator as well as the source itself are therefore adjacent and do not generate gaps in the angular spectrum of the rays incident on the prisms, thereby eliminating the spurious lobes.

According to another characteristic of the present invention, the face of the transmission means comprising the microprismatic structure is a curved surface, preferably inwardly curved in such a way as to join up the opposite face with the exit face of the transmission means. With this particular structure, all of the light rays including the most horizontal rays are intercepted by the microprisms and reflected towards the exit face, thereby increasing the light flux.

BRIEF DESCRIPTION OF THE DRAWINGS

Other characteristics and advantages of the present invention will emerge on reading the description of a preferred embodiment, this description being given with reference to the appended drawings in which.

To simplify the description, in the figures the same elements bear the same references.

DETAILED DESCRIPTION OF PREFERED EMBODIMENTS

Figure 1:
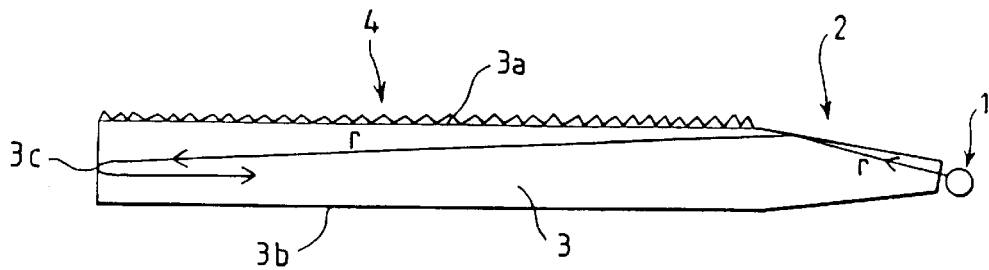
FIG. 1, already described, is a diagrammatic representation of a lighting system according to the prior art.
Figure 2:
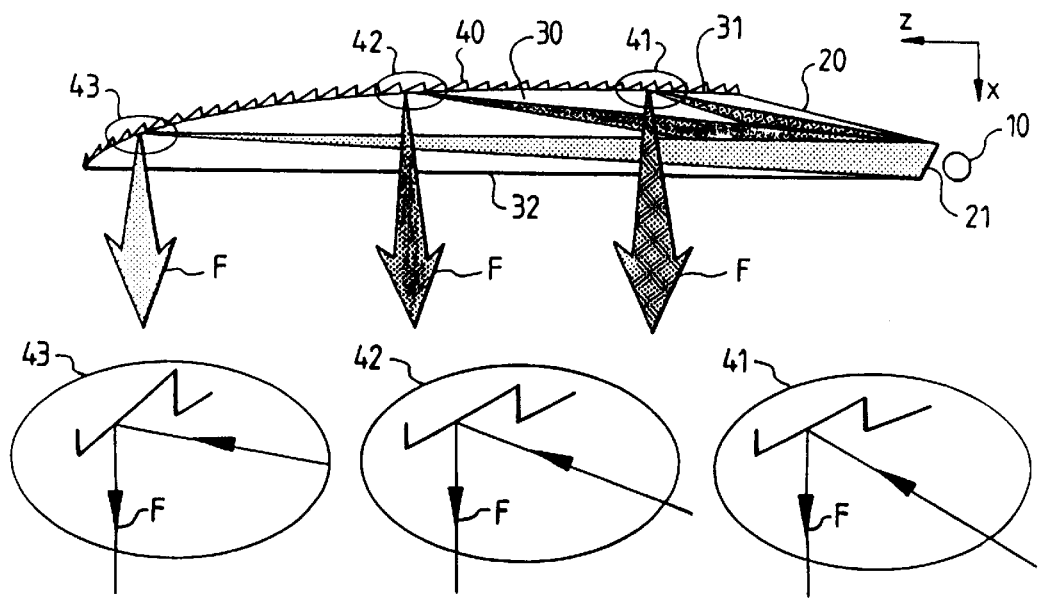
FIG. 2 is a diagrammatic representation of a transmission means in accordance with the present invention with some of the microprisms enlarged.

Represented in FIG. 2 is a lighting system in accordance with the present invention. In the known manner, this lighting system comprises a light source 10 which can consist of a fluorescent tube. This fluorescent tube is normally surrounded by a reflector, preferably substantially parabolic, which returns the light rays towards a collimation means 20 which will be described in greater detail with reference to FIG. 3. A means of transmission of light 30 or waveguide is provided at the exit of the collimation means 20. As represented in FIG. 2, the waveguide 30 comprises a first face 31 or upper face on which a microprismatic structure 40 is made, the role of which is to specularly reflect the light rays exiting from the collimation means towards the lower face 32 of the waveguide, also termed the exit face.

Figure 4:
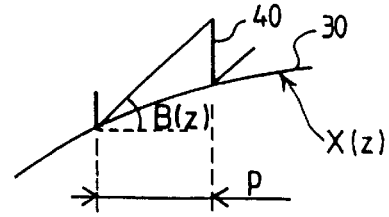
FIG. 4 is an element of FIG. 2 showing the variables in the equations.

In accordance with the present invention, the upper face 31 on which the microprismatic structure is made is a curved surface. This curved surface is such that at its opposite end from the light source it meets the exit face 32. The definition of the shape of the curved surface is such that it allows a uniform distribution of the flux. The shape of this curve can be given by a polynomial equation of the form:

$$X(z) = az^4 + bz^3 + cz^2 + dz$$

in which z=ip with i=[o,N], p being the spacing of a microprism and a, b, c, d being coefficients depending on the parameters of the collimator and on the flux distribution dimensions, as represented in FIG. 4.

By way of example, the equation can be as follows:

$$X(z) = -1.92e^{-7}z^4 + 6.51e^{-5}z^3 - 2.46e^{-3}z^2 + 1.77e^{-2}z$$

the coefficients in the polynomial equation being chosen by simulation in such a way as to optimize the exit flux.

Moreover, according to another characteristic of the present invention, as represented clearly at 41, 42, 43 in FIG. 2, the microprismatic structure is not a homogeneous structure, but the angle of inclination of the prisms changes as a function of their position on the curved surface. The angle of the prisms is adapted so that the reflected rays all exit at virtually the same angle of impact, as represented by the arrows F in FIG. 2.

The change in the angle of the prisms can be given by the equation:

$$B(z) = Az^4 + Bz^3 + Cz^2 + Dz + 35.7 (deg)$$

with $z = (i - 0.5) \cdot p$   $i = [1, N]$ for $B(z)$ being the spacing between two microprisms, as represented clearly in FIG. 4 and A, B, C, D being coefficients depending on the above parameters.

By way of example, the equation used may be as follows:

$$B(z) = -2.30e^{-7}z^4 + 2.12e^{-5}z^3 - 4.01e^{-5}z^2 + 9.61e^{-2}z + 35.7 (deg)$$

the coefficients being chosen as above, by simulation.

With this structure, the prisms at the end of the waveguide or transmission means, such as the prism 43, receive much less inclined rays than those at the start of the transmission means, such as the prism referenced 41. This particular structure allows spatial homogenization of the direction of the exit lobe.

Figure 3:
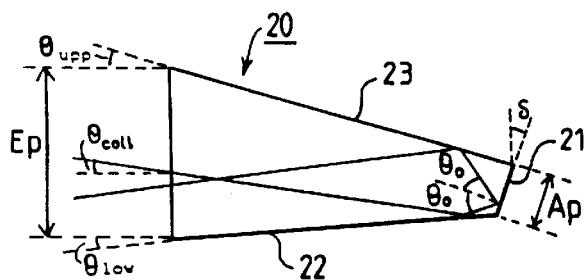
FIG. 3 is a diagrammatic sectional view of a collimator which can be used in the present invention.

Moreover, as represented in FIGS. 2 and 3 by the reference 20, it may be seen that the collimation means 20 has an entrance surface 21 inclined with respect to the horizontal.

The various parameters of the collimator can be calculated using the following equations:

$$\vartheta_{colf}(\vartheta o - \delta) - 2\vartheta_{low})$$

$$\vartheta_{COLF}(\vartheta o - \delta) - 2\vartheta_{upp})$$

$$L_{coll} = \frac{EP - Ap(\cos\delta - \sin\delta\tan\vartheta_{low})}{\tan\vartheta_{upp} + \tan\vartheta_{low}}$$

Thus, the collimator has an entrance face 21 inclined in such a way that the lower face 22 is nearly horizontal, namely in alignment with the exit face of the transmission means. Considerable collimation is obtained in this way. Furthermore, the various images of the source which arise from reflections off the exit face and off the faces 22, 23 of the collimator, as well as the source itself, are therefore adjacent and do not generate gaps in the angular spectrum of the rays incident on the prisms, thereby eliminating the spurious lobes.

The collimator used may be either a linear collimator, as represented in FIG. 3, or a concentrator known as a CPC standing for "Compound Parabolic Concentrator". The use of a collimator with its entrance face inclined generates a high flux at the start of the guide. However, the excess illumination at the entrance to the waveguide can be attenuated with the shape of the curved surface containing the microprisms, it being possible to choose this surface in such a way that the curve rises at the start so as to reduce the effective area of this zone, and then falls towards the exit face so as to recover the maximum flux. This phenomenon is avoided when using a CPC collimator whose entrance face is inclined, since this collimator has a more homogeneous exit distribution, in a transverse plane. The curve of the extractor surface is then tighter.

Figure 5:
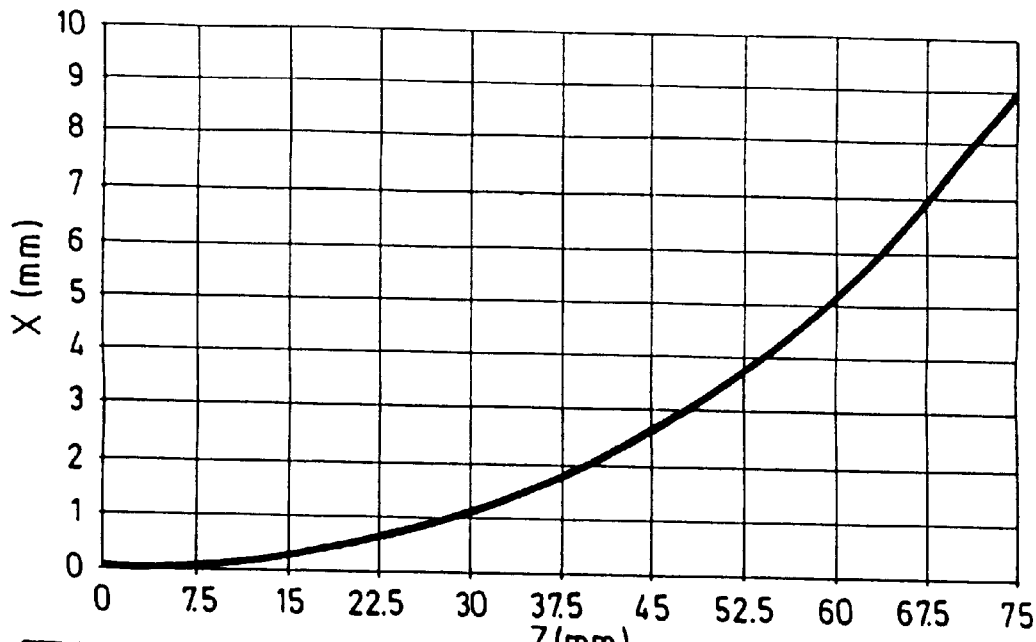
FIGS. 5 and 6 respectively represent the shape of the curve of the extractor face and the changes in the angle of the prisms for a particular system.
Figure 6:
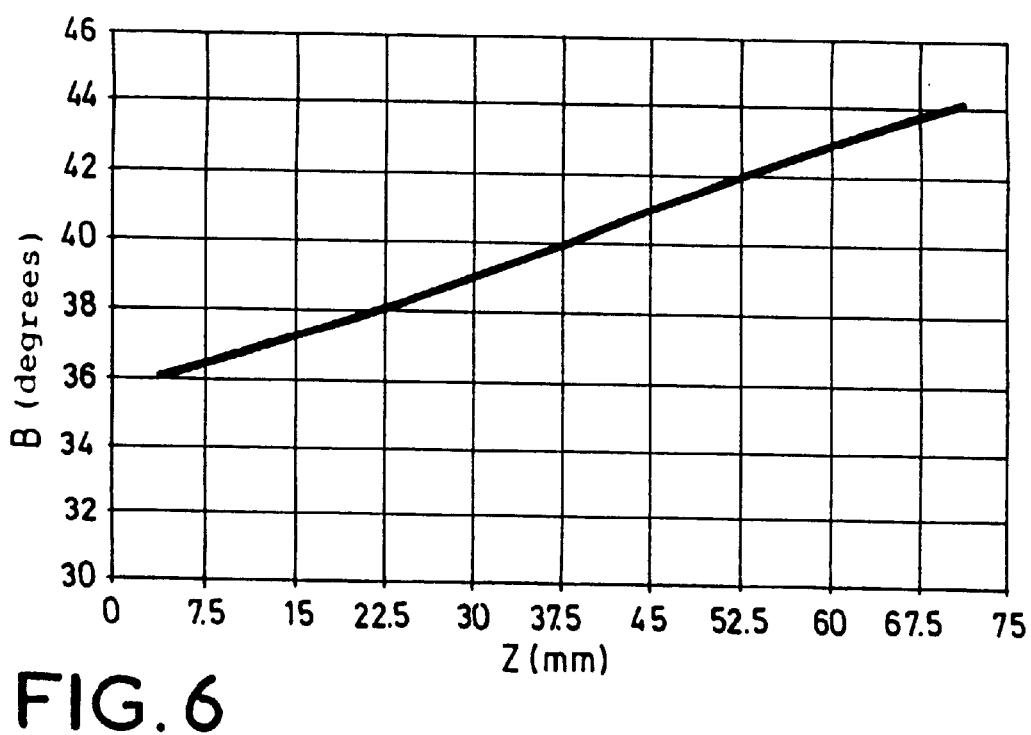

The curves of FIGS. 5 and 6 were obtained using a backlight system having the following characteristics:
collimator:
    entrance half-face=1.5 mm
    thickness=9 mm
    length L=14.6 mm
    angle of collimation=19°
    maximum angle=33.6°
    inclination=23°
transmission means or waveguide:
    length=75 mm
    depth=90 mm
    thickness=9 mm
    the material used is acrylic material having a refractive index n=1.49.

In this case, the curves X and B are given by the associated values appearing at the top of the two curves.

It is evident to those skilled in the art that the basic structure described above can be used to obtain more flux and to improve the angle of view. Thus, it is possible to use two structures with several source tubes, such as described above, arranged symmetrically with respect to the exit face or placed one on top of the other.

What is claimed is:

1. Backlight system for transmissive electro-optical modulator comprising:
    at least one source of light rays;
    at least one reflector for returning the light rays along a first direction referenced z;
    a means of transmission of light, positioned at the exit of the reflector in such a way as to transport the light rays along the z direction, one of the faces of the transmission means lying along the z direction comprising a micro-prismatic structure which specularly reflects the light rays and extracts them from the transmission means substantially along a second direction referenced x perpendicular to the first direction,
    a collimation means situated between the source of light rays and the transmission means,
        wherein the collimation means comprises an entrance face inclined with respect to the first direction referenced z.

2. System according to claim 1, wherein the collimation means is a linear collimator with inclined entrance face.

3. System according to claim 1, wherein the collimation means is a concentrator with parabolic element or "CPC" with inclined entrance face.

4. System according to claim 1, wherein the face of the transmission means comprising the micro-prismatic structure is a curved surface.

5. System according to claim 4, wherein the curved surface is inwardly curved in such a way as to join up with the opposite face or exit face of the transmission means.

6. System according to claim 4, characterized in that the angle of the prisms of the micro-prismatic structure is adapted, as a function of their position along the curved surface, so that the reflected rays are substantially perpendicular to the exit face.

7. System according to claim 4, characterized in that the equations for the shape of the curved surface and for the angle of the prisms are respectively:

$$X(z) = az^4 + bz^3 + cz^2 + dz$$

$$B(z) = Az^4 + Bz^3 + Cz^2 + Dz + E(\deg)$$

with $z = i \cdot p \quad i = [O, N]$ for $X(2)$ $z = (i - 0.5) \cdot p \quad i = [1, N]$ for $B(z)$ represents the spacing of the microprisms and a, b, c, d, A, B, C, D are coefficients chosen as a function of the parameters of the collimator, such as thickness, inclination, angles of collimation and flux distribution dimensions.

* * * * *